(12) United States Patent
Feng

(10) Patent No.: US 8,026,997 B2
(45) Date of Patent: *Sep. 27, 2011

(54) AREA ACTIVE BACKLIGHT WITH STEERABLE LIGHT SOURCE

(75) Inventor: Xiao-fan Feng, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 67 days.

This patent is subject to a terminal disclaimer.

(21) Appl. No.: 12/492,609

(22) Filed: Jun. 26, 2009

(65) Prior Publication Data

US 2010/0188602 A1 Jul. 29, 2010

Related U.S. Application Data

(63) Continuation-in-part of application No. 12/322,115, filed on Jan. 28, 2009.

(51) Int. Cl.
*G02F 1/1335* (2006.01)
*G02B 6/00* (2006.01)

(52) U.S. Cl. .............. 349/65; 385/133; 362/607

(58) Field of Classification Search ............. 362/612, 362/615, 561, 607, 616; 349/62, 65–69, 349/113, 139; 359/619–623; 345/33; 385/133
See application file for complete search history.

(56) References Cited

U.S. PATENT DOCUMENTS

| | | | |
|---|---|---|---|
| 4,234,245 A | 11/1980 | Toda et al. | |
| 4,794,370 A | 12/1988 | Simpson et al. | |
| 4,807,967 A | 2/1989 | Veenvliet et al. | |
| 5,099,343 A * | 3/1992 | Margerum et al. | 349/63 |
| 5,319,491 A | 6/1994 | Selbrede | |
| 5,440,197 A * | 8/1995 | Gleckman | 313/110 |
| 5,806,955 A * | 9/1998 | Parkyn et al. | 362/612 |
| 5,953,469 A * | 9/1999 | Zhou | 385/22 |
| 6,011,602 A * | 1/2000 | Miyashita et al. | 349/65 |
| 6,100,952 A * | 8/2000 | Marvin et al. | 349/62 |
| 6,177,761 B1 * | 1/2001 | Pelka et al. | 313/512 |
| 6,185,357 B1 * | 2/2001 | Zou et al. | 385/133 |
| 6,611,303 B1 | 8/2003 | Lee et al. | |
| 6,741,301 B2 * | 5/2004 | Tsuji | 349/58 |
| 7,293,908 B2 * | 11/2007 | Beeson et al. | 362/612 |
| 7,430,355 B2 | 9/2008 | Heikenfeld et al. | |
| 7,518,664 B2 * | 4/2009 | Mather et al. | 349/15 |
| 7,697,080 B2 * | 4/2010 | Mather et al. | 349/15 |
| 7,813,042 B2 * | 10/2010 | Mather et al. | 359/619 |
| 7,815,358 B2 * | 10/2010 | Inditsky | 362/615 |
| 2002/0018158 A1 | 2/2002 | Putilin | |
| 2004/0196560 A1 * | 10/2004 | Nagasawa et al. | 359/619 |
| 2004/0218234 A1 | 11/2004 | Kuroki et al. | |
| 2005/0018103 A1 | 1/2005 | Lubart et al. | |
| 2005/0231457 A1 | 10/2005 | Yamamoto et al. | |
| 2006/0007102 A1 | 1/2006 | Yasuoka et al. | |
| 2006/0152812 A1 * | 7/2006 | Woodgate et al. | 359/619 |
| 2007/0253216 A1 | 11/2007 | Watanabe | |
| 2008/0049441 A1 | 2/2008 | Lee | |
| 2008/0143824 A1 | 6/2008 | Kuroki et al. | |
| 2008/0212158 A1 | 9/2008 | Van Ostrand | |

* cited by examiner

*Primary Examiner* — Akm Ullah
(74) *Attorney, Agent, or Firm* — Chernoff, Vilhauer, McClung & Stenzel

(57) ABSTRACT

A liquid crystal display includes a backlight. The backlight includes a plurality of waveguides to selectively direct light. A set of selection elements in combination with the backlight selectively direct light to the front of the display.

21 Claims, 16 Drawing Sheets

AREA ACTIVE BACKLIGHT WITH STEERABLE LIGHT SOURCE

CROSS-REFERENCE TO RELATED APPLICATIONS

This application is a continuation-in-part of U.S. patent application Ser. No. 12/322,115, filed Jan. 28, 2009.

BACKGROUND OF THE INVENTION

The present invention relates to a liquid crystal panel, and in particular to a liquid crystal panel with a steerable light source.

The local transmittance of a liquid crystal display (LCD) panel or a liquid crystal on silicon (LCOS) display can be varied to modulate the intensity of light passing from a backlit source through an area of the panel to produce a pixel that can be displayed at a variable intensity. Whether light from the source passes through the panel to an observer or is blocked is determined by the orientations of molecules of liquid crystals in a light valve.

Since liquid crystals do not emit light, a visible display requires an external light source. Small and inexpensive LCD panels often rely on light that is reflected back toward the viewer after passing through the panel. Since the panel is not completely transparent, a substantial part of the light is absorbed while it transits the panel and images displayed on this type of panel may be difficult to see except under the best lighting conditions. On the other hand, LCD panels used for computer displays and video screens are typically backlit with fluorescent tubes or arrays of light-emitting diodes (LEDs) that are built into the sides or back of the panel. To provide a display with a more uniform light level, light from these point or line sources is typically dispersed in a diffuser panel before impinging on the light valve that controls transmission to a viewer.

The transmittance of the light valve is controlled by a layer of liquid crystals interposed between a pair of polarizers. Light from the source impinging on the first polarizer comprises electromagnetic waves vibrating in a plurality of planes. Only that portion of the light vibrating in the plane of the optical axis of a polarizer can pass through the polarizer. In an LCD the optical axes of the first and second polarizers are arranged at an angle so that light passing through the first polarizer would normally be blocked from passing through the second polarizer in the series. However, a layer of translucent liquid crystals occupies a cell gap separating the two polarizers. The physical orientation of the molecules of liquid crystal can be controlled and the plane of vibration of light transiting the columns of molecules spanning the layer can be rotated to either align or not align with the optical axes of the polarizers.

The surfaces of the first and second polarizers forming the walls of the cell gap are grooved so that the molecules of liquid crystal immediately adjacent to the cell gap walls will align with the grooves and, thereby, be aligned with the optical axis of the respective polarizer. Molecular forces cause adjacent liquid crystal molecules to attempt to align with their neighbors with the result that the orientation of the molecules in the column spanning the cell gap twist over the length of the column. Likewise, the plane of vibration of light transiting the column of molecules will be "twisted" from the optical axis of the first polarizer to that of the second polarizer. With the liquid crystals in this orientation, light from the source can pass through the series polarizers of the translucent panel assembly to produce a lighted area of the display surface when viewed from the front of the panel.

To darken a pixel and create an image, a voltage, typically controlled by a thin film transistor, is applied to an electrode in an array of electrodes deposited on one wall of the cell gap. The liquid crystal molecules adjacent to the electrode are attracted by the field created by the voltage and rotate to align with the field. As the molecules of liquid crystal are rotated by the electric field, the column of crystals is "untwisted," and the optical axes of the crystals adjacent the cell wall are rotated out of alignment with the optical axis of the corresponding polarizer progressively reducing the local transmittance of the light valve and the intensity of the corresponding display pixel. Color LCD displays are created by varying the intensity of transmitted light for each of a plurality of primary color elements (typically, red, green, and blue) that make up a display pixel.

Referring to FIG. 1, a liquid crystal display (LCD) 50 (indicated by a bracket) comprises, a backlight 52 and a light valve 54 (indicated by a bracket). Since liquid crystals do not emit light, most LCD panels are backlit with fluorescent tubes or arrays of light-emitting diodes (LEDs) that are built into the sides or back of the panel. To disperse the light and obtain a more uniform intensity over the surface of the display, light from the backlight 52 typically passes through a diffuser 56 before impinging on the light valve 54.

The transmittance of light from the backlight 52 to the eye of a viewer 58, observing an image displayed on the front of the panel, is controlled by the light valve 54. The light valve 54 comprises a pair of polarizers 60 and 62 separated by a layer of liquid crystals 64 contained in a cell gap between the polarizers. Light from the backlight 52 impinging on the first polarizer 62 comprises electromagnetic waves vibrating in a plurality of planes. Only that portion of the light vibrating in the plane of the optical axis of a polarizer can pass through the polarizer. In an LCD light valve, the optical axes of the first 62 and second 60 polarizers are typically arranged at an angle so that light passing through the first polarizer would normally be blocked from passing through the second polarizer in the series. However, the orientation of the translucent crystals in the layer of liquid crystals 64 can be locally controlled to either "twist" the vibratory plane of the light into alignment with the optical axes of the polarizers, permitting light to pass through the light valve creating a bright picture element or pixel, or out of alignment with the optical axis of one of the polarizers, attenuating the light and creating a darker area of the screen or pixel.

The surfaces of a first glass plate 63 and a second glass plate 61 form the walls of the cell gap and are buffed to produce microscopic grooves to physically align the molecules of liquid crystal 64 immediately adjacent to the walls. Molecular forces cause adjacent liquid crystal molecules to attempt to align with their neighbors with the result that the orientation of the molecules in the column of molecules spanning the cell gap twist over the length of the column. Likewise, the plane of vibration of light transiting the column of molecules will be "twisted" from the optical axis of the first polarizer 62 to a plane determined by the orientation of the liquid crystals at the opposite wall of the cell gap. If the wall of the cell gap is buffed to align adjacent crystals with the optical axis of the second polarizer, light from the backlight 52 can pass through the series of polarizers 60 and 62 to produce a lighted area of the display when viewed from the front of the panel (a "normally white" LCD).

To darken a pixel and create an image, a voltage, typically controlled by a thin film transistor, is applied to an electrode in an array of transparent electrodes deposited on the walls of the cell gap. The liquid crystal molecules adjacent to the electrode are attracted by the field produced by the voltage and rotate to align with the field. As the molecules of liquid crystal are rotated by the electric field, the column of crystals is "untwisted," and the optical axes of the crystals adjacent to the cell wall are rotated progressively out of alignment with the optical axis of the corresponding polarizer progressively reducing the local transmittance of the light valve 54 and attenuating the luminance of the corresponding pixel. Conversely, the polarizers and buffing of the light valve can be arranged to produce a "normally black" LCD having pixels that are dark (light is blocked) when the electrodes are not energized and light when the electrodes are energized. Color LCD displays are created by varying the intensity of transmitted light for each of a plurality of primary color (typically, red, green, and blue) sub-pixels that make up a displayed pixel. A set of color filters 84, a polarizer 82 arranged in front of the touch screen can significantly reduce the reflection of ambient light, also a cover plate 86 may be placed over the polarizer 82.

The aforementioned example was described with respect to a twisted nematic device. However, this description is only an example and other devices may likewise be used, including, but not limited to, multi-domain vertical alignment (MVA), patterned vertical alignment (PVA), in-plane switching (IPS), and super-twisted nematic (STN) type LCDs.

FIG. 2 illustrates a typical liquid crystal display 100 (i.e., LCD) with a side-lit cold cathode florescent light (i.e., CCFL) backlight lamp 110. The light from the CCFL lamp 110 may be coupled into an optical waveguide 120. The emitted light is primarily confined in the optical waveguide 120 via total internal reflection (TIR) and scattering from the bottom surface 130 of the optical waveguide 120 causes the light that has a scattered angle less than the critical angle to pass through the front of the optical waveguide 120 and distribute generally uniformly across the display. Unfortunately, the light provided by the backlight 110 can not be selectively controlled to different regions of the display.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

It is desirable to include an active backlight which selectively provides light to different regions of the display to improve the image quality. Such regions of the display may be as small as a pixel, or sub-pixel, or a fraction of a sub-pixel, but in general are significantly larger than a pixel and are preferably patterned so that it produces uniform light output for uniform input. In addition, being able to selectively reduce the backlight in different regions of the display also decreases the overall power consumption of the display. However, two dimensional backlights traditionally require a separate driver for each active unit, which is relatively expensive for a large display area.

A display may include a series (or plurality) of single light emitting diodes arranged in a parallel fashion along the edge of the display, or other light sources, each of which provides illumination to a one-dimensional striped region across the display. The light sources may likewise be arranged to illuminate regions of the display in any other manner. Collectively, the one-dimensional illuminated regions illuminate the entire display. In relation to a two-dimensional array of light emitting diodes, the one-dimensional array of light emitting diodes result in a lower cost for the display, but fail to include the illumination selectivity capable with the two-dimensional array.

After considering both the desirability of a two-dimensional array of light sources together with low cost benefits of a one-dimensional array of light sources, it was determined that such two dimensional array capabilities with a one dimensional array are achievable by using an optical waveguide together with a temporal based illumination technique for different regions of the display. This combination achieves both the benefits of the selectivity of the two-dimensional array together with the low cost and power reduction benefits of a one-dimensional array. Moreover, a spatially temporal illumination of pixels may also be used to improve image quality, namely, a reduction in image blur when display moving objects, as well as increased contrast ratio from dark black. The light waveguide may be any type of structure that directs or otherwise supports the passage of light from one location to another.

Figure 3:
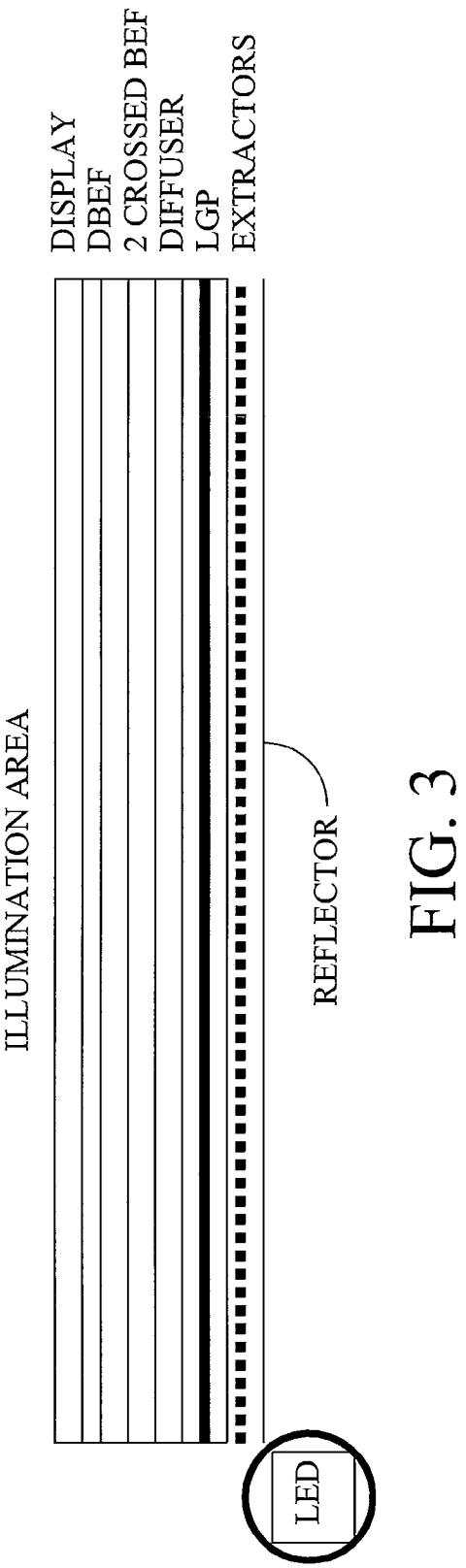
FIG. 3 illustrates a liquid crystal display with an optical waveguide.

FIG. 3 illustrates a backlight that includes a LED light source. Light from the LED is coupled into the waveguide and a light extractor is employed to distribute light uniformly across the screen.

Figure 4:
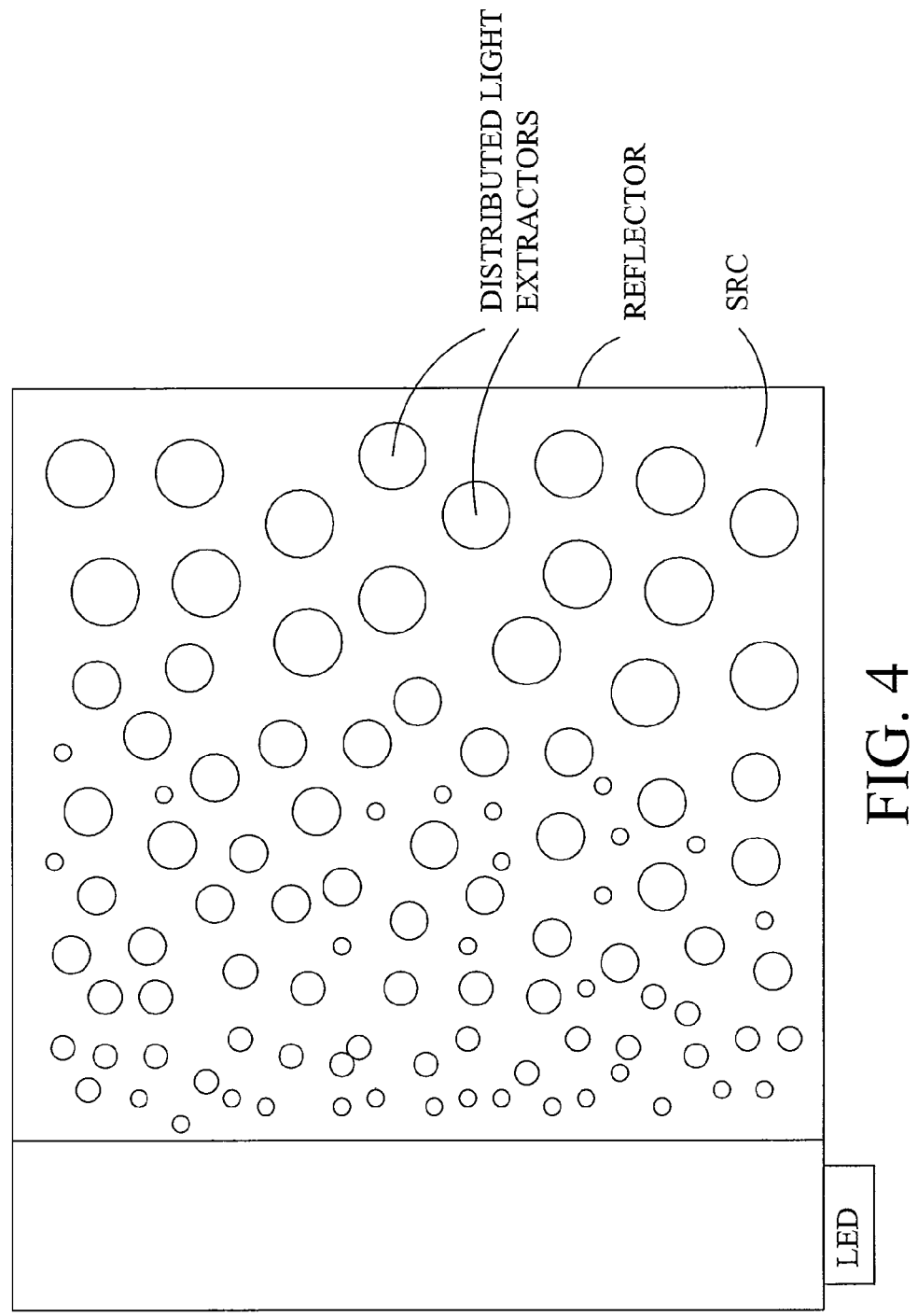
FIG. 4 illustrates a light extractor for a light emitting diode backlight.

FIG. 4 illustrates the light extractor of FIG. 3. The circles in the figures indicate the areas that no longer satisfy the TIR condition and accordingly distribute the light into the LCD across the display. The area and distribution of these extractors are arranged to achieve a generally uniform backlight.

Figure 1:
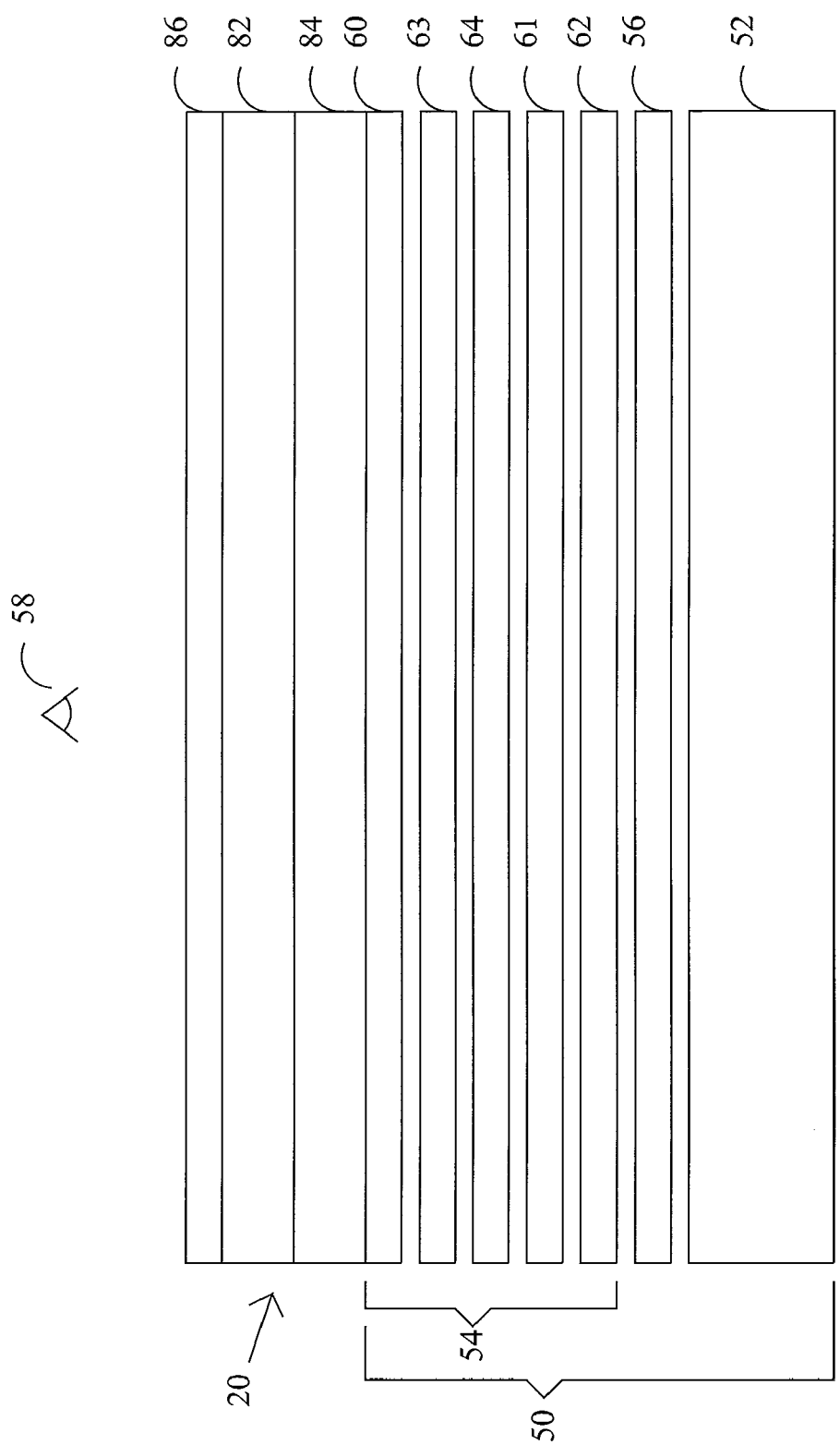
FIG. 1 illustrates a liquid crystal display.
Figure 2:
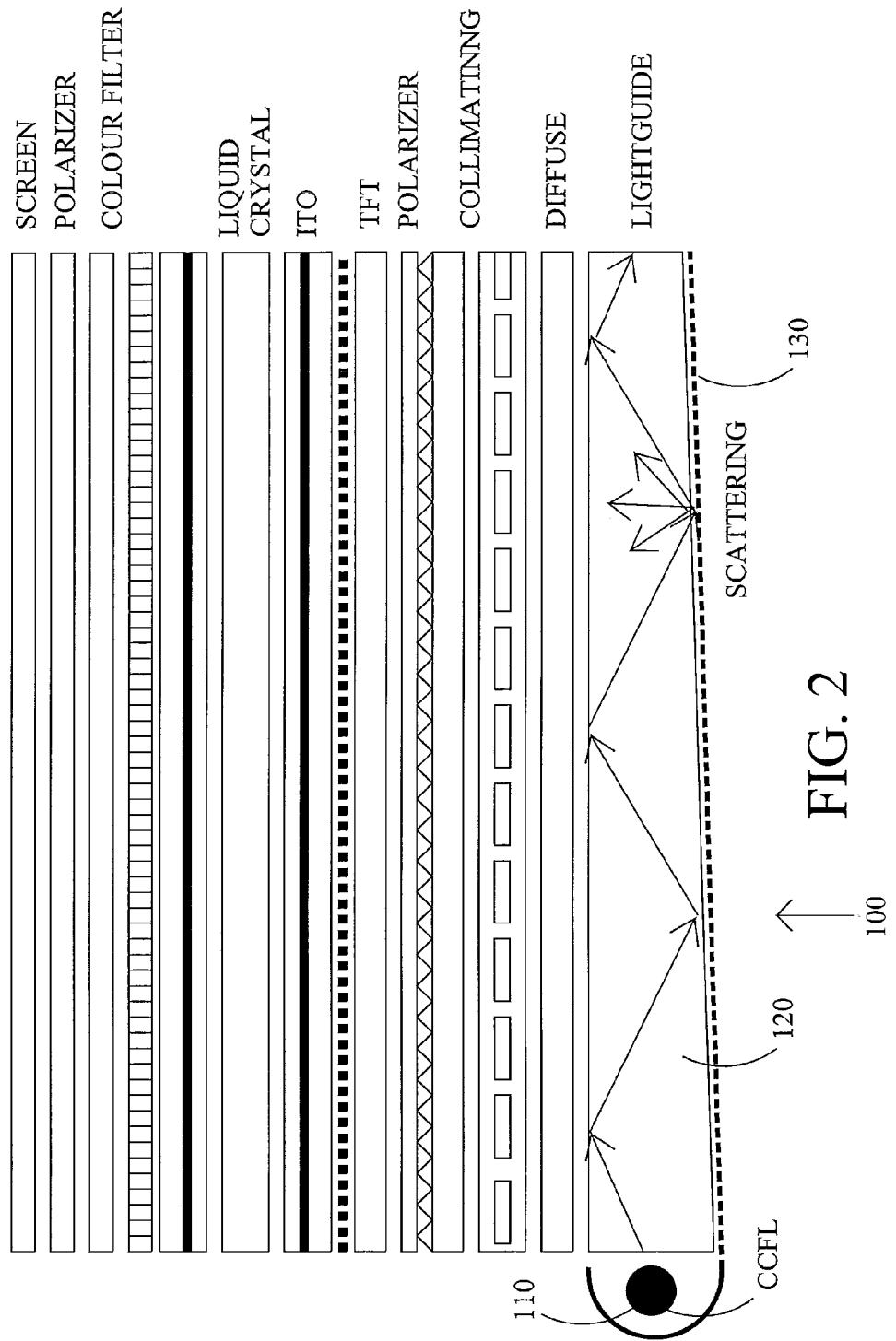
FIG. 2 illustrates a liquid crystal display with a side lit backlight.
Figure 5:
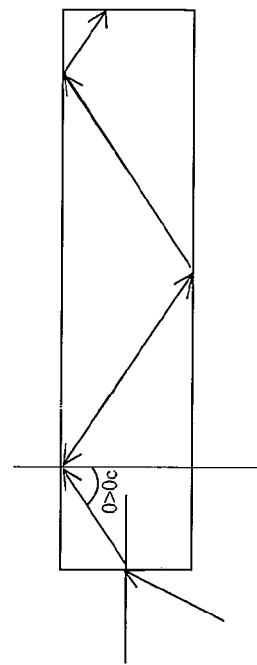
FIG. 5 illustrates TIR in a waveguide.

In the backlight configurations illustrated in FIGS. 2, 3, and 4, the total internal reflection is used to guide the light from a light source such as CCFL, LED, or laser to the front of the display. Referring to FIG. 5, a TIR waveguide is illustrated. The TIR light guide may be made from a transparent polymer with a refractive index of 1.50 giving a critical angle of 41.8°. The light generated from LEDs enters the light guide; the angular distribution of rays is bound within $\pm\theta_c$. According to Snell's Law, all rays strike the interior wall at angles greater than $\theta_c$ will be totally internally reflected and will travel along the light guide. This means that all beams incident on the input face of the guide are guided.

Figure 6:
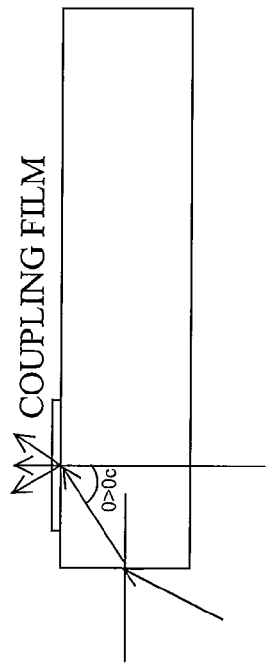
FIG. 6 illustrates FTIR in a waveguide.

There are many ways to extract the light from the waveguide. One way to extract light is to using scattering to change the direction of the light ray such that the incident angle is less than the critical angle $\theta_c$. Another way to extract light is the have another material of a higher, lower, or the same refractive index at a very close proximity (such as within a few wavelengths) of the waveguide so that the evanescent wave from the TIR couples to the new material (evanescent wave coupling). The evanescent wave coupling causes a frustrated total internal reflection (FTIR) which results in the extraction of light from the waveguide. FIG. 6 illustrates frustrated total internal reflection in an optical waveguide. The light can thus be selectively extracted from an optical waveguide at desirable locations.

Figure 7:
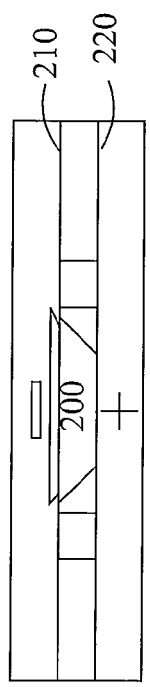
FIG. 7 illustrates FTIR display.

One technique for constructing a display that incorporates FTIR is to use one or more light guides at angles that maximize (or otherwise have significant TIR) the total internal reflection to reduce light from escaping the backlight. Referring to FIG. 7, a thin film layer may be used to form a lens/shutter by sandwiching micro optic structures 200 between two transparent conductors 210 and 220. The refractive indices at the boundaries of the layers and surrounding the TFT structure on the light guide approximate those of air to preserve total internal reflection. Bonding the layer to the slightly elevated TFT structure creates a small air gap between the light guide and the film, thus the layer tends to literally ride on the TFT elements of the display.

When oppositely charged at any given pixel, the two conductive layers 210, 220 attract each other (as shown in FIG. 7). This pulls the micro optic structures down through the air gap until they contact the light guide. Once a portion of the layer touches the light guide beneath, the total internal reflection becomes frustrated, thus permitting light to escape through the associated pixel at that location. The duration of the charge controls the opening and closing of the "shutter." At any given pixel, this duration determines the relative intensity of the associated pixel, sub-pixel, and/or color.

The use of a two dimensional area active backlight enables one or more of the following advantages:
  1. Increase in the contrast with reduced black level;
  2. Reduced power consumption;
  3. Motion blur reduction with backlight flashing; and
  4. Wide color gamut with the use RGB backlight, and maintaining the size of the color gamut with reduced brightness.

Unfortunately, two dimensional area active backlights require a large number of driving circuits. For an example, a backlight with 48×24×3 backlight elements requires 3456 drivers, which can be prohibitively expensive. Even more important is that the more back light elements, the more non-uniformity that may result together with the expensive of the photo sensor circuits to compensate for the non-uniformity. Thus, it is advantageous to reduce the number of back light elements.

Figure 8:
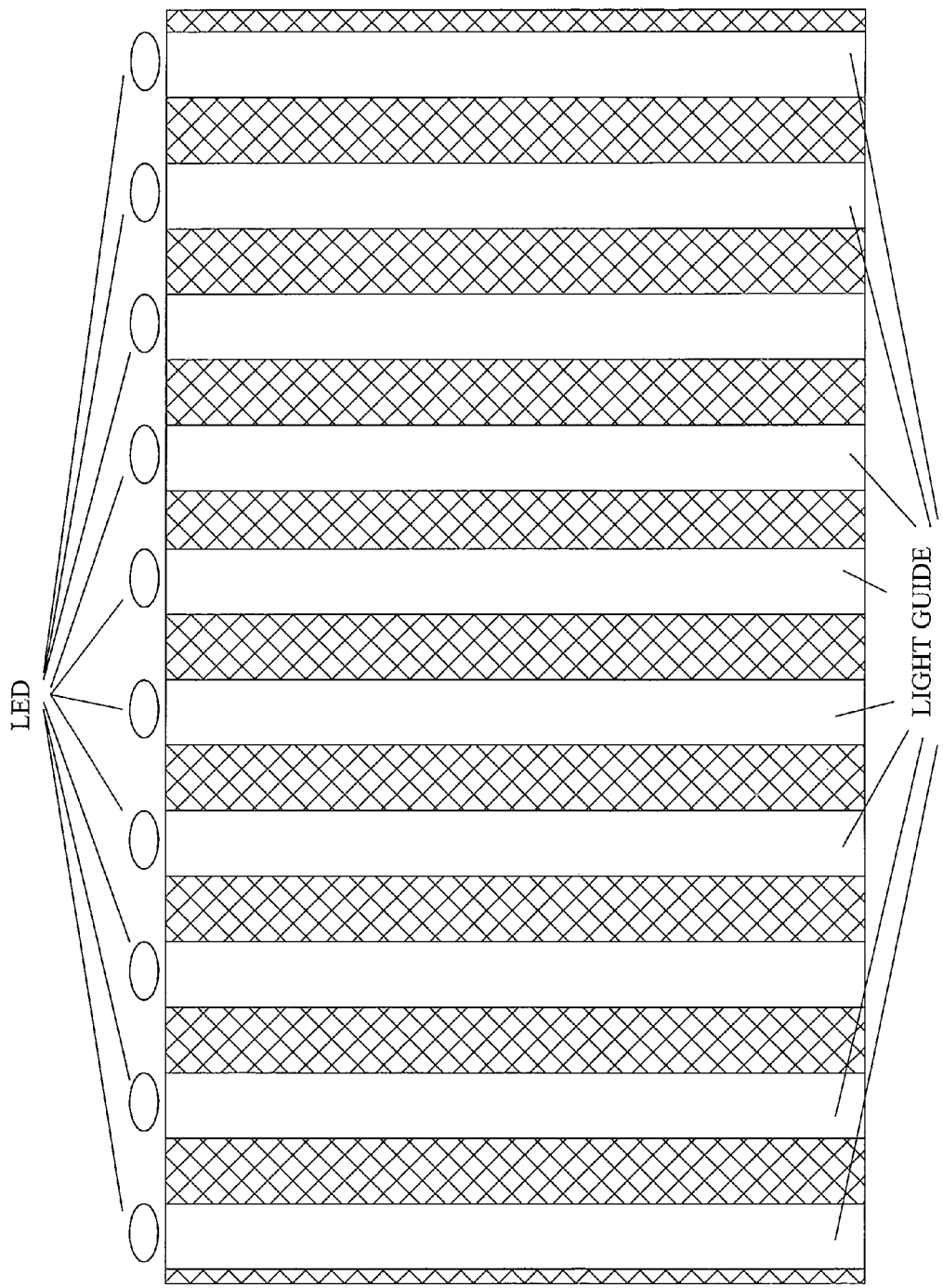
FIG. 8 illustrates LCD backlight from 1D linear optical waveguide.

One technique to reduce the number of back light elements ("BLEs") is to use a one-dimensional linear backlight where each back light element consists of one or more LEDs and an optical waveguide that extends across a part of or the whole display. FIG. 8 illustrates a backlight with ten one dimensional BLEs, each covering one vertical strip from top to bottom of the display. The use of a plurality of one dimensional BLEs reduces the number of drivers thus saving expense. Also, a plurality of one-dimensional BLEs makes it easier to monitor and compensate for non-uniform light output of the BLEs to achieve spatial uniformity and color consistency. While the use of a series of back light elements together with a light guide is an improvement, the advantages consistent with two-dimensional backlights is not fully achieved, including, a high contrast ratio, reduced power consumption, a wide color gamut at low light levels, and/or reduced motion blur from backlight flashing.

Figure 9:
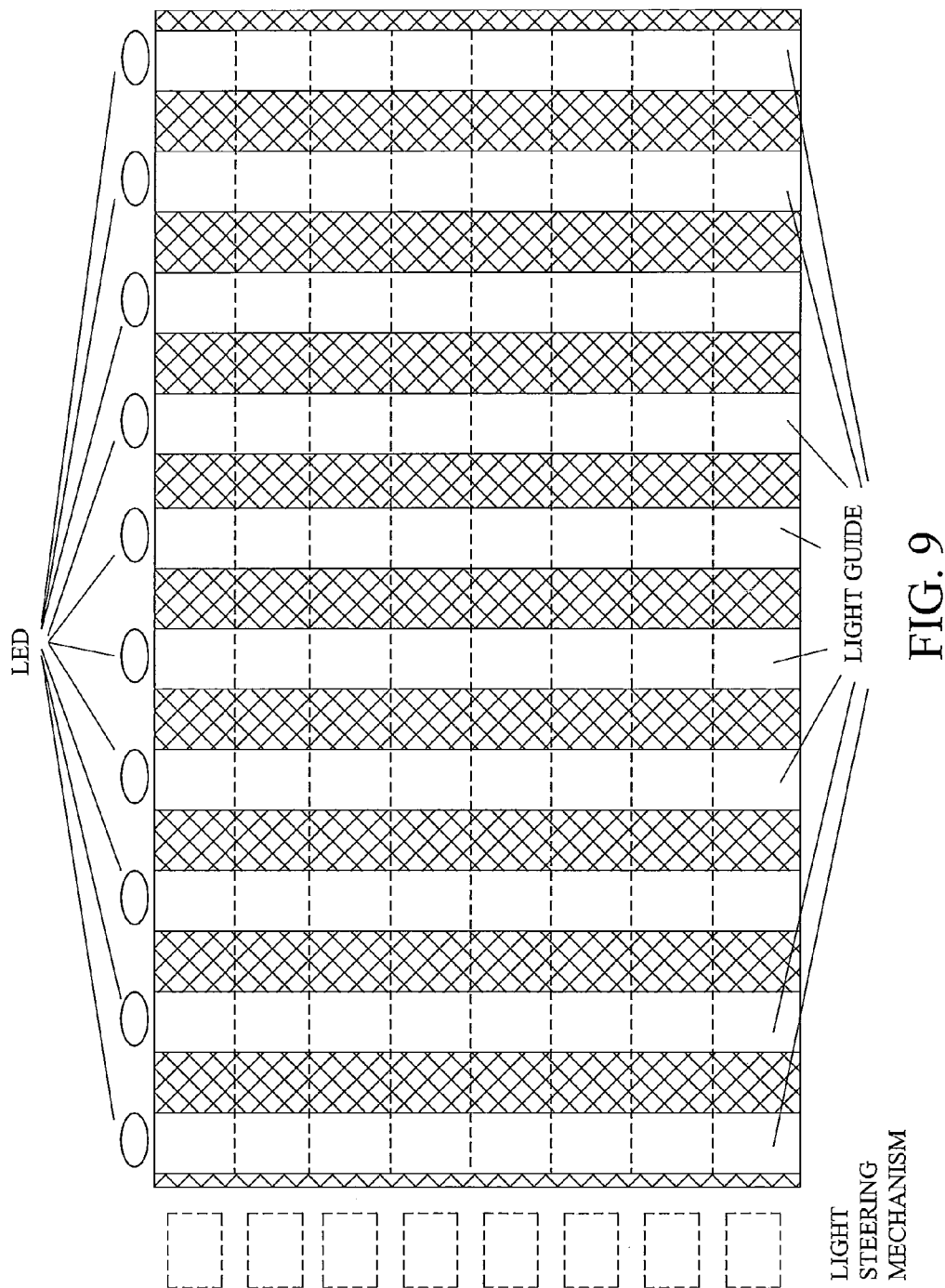
FIG. 9 illustrates a LCD backlight consisting of 1D backlight elements.
Figure 10:
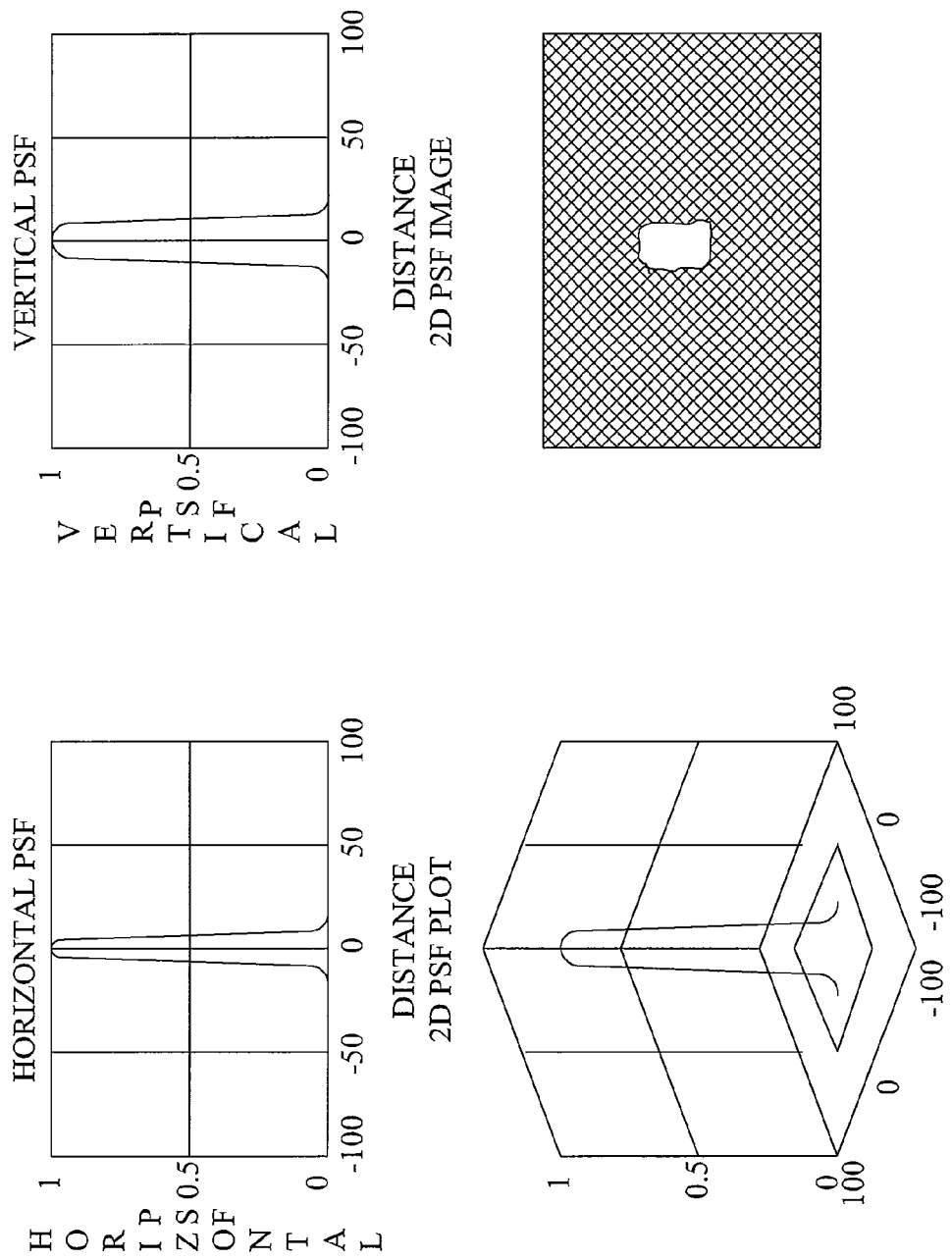
FIG. 10 illustrates a PSF.

To achieve two-dimensional functionality with a set of one-dimensional light sources, a light steering technique may be used to actively extract light to enable a two-dimensional area active backlight from one-dimensional linear or point light sources. The light from the LED or other light source is coupled into the optical waveguide, but the light output from selected regions, such as that of one or more sets of pixels, is scanned from top to bottom (or any other suitable addressing mechanism). For an example, a steering mechanism may steer the light output from the top to the bottom as shown in FIG. 9. When one of the steering devices is activated, the associated horizontal row in the optical waveguide is open for light extraction; light is extracted from that row only and the other areas remains black. The activated light steering device may be de-activated and another light steering device is activated. The associated horizontal row of the new activated light steering device results in the optical waveguide being open for light extraction for that row while the other areas remains black. This process may be repeated for each light steering mechanism, preferably in a sequential manner. More than one light steering mechanism may be simultaneously selected, if desired. One or more of the light steering mechanisms may be selected multiple times while presenting an image, if desired. The display may have light guides that extend over only a part of the width of the display, thus requiring multiple light guides to cover the width of the display, if desired. This light steering with the temporal multiplexed driving results in a two dimensional area active backlight using a one-dimensional waveguide. The point spread function (PSF) is horizontally defined by the one dimensional waveguide light output profile, and vertically by the light output profile of the steering. FIG. 10 illustrates an example PSF using a steerable one-dimensional backlight.

The steering mechanism may be achieved mechanically with a controllable shutter that is similar to the window shutter. Each of the light steering units is consisted of a motorized shutter. When a row is selected for light output, the motor opens the shutter to allow light output for that horizontal row, then closes, and the next row shutter opens and so on. Although mechanical shutter may be used, it may pose a noise or life time issues.

A steering mechanism based on the evanescent wave coupling as shown in FIG. 6 is preferred. There are many ways to achieve evanescent wave coupling. In most cases, a change in the refractive index near the waveguide causes frustrated total internal reflection. Some techniques to create FTIR include:
  1. Electrostatic techniques where the TFT controls the electrode so that the two layers with opposite charge attract each other. The electrostatic force caused the two films to touch. Once the two film touches, the light is coupled out as shown in FIG. 7. In some cases, only a few light switches may be necessary to achieve a desirable viewing experience.

2. Piezoelectric techniques where a voltage causes the coupling film to touch the optical waveguide.
3. Electro-optical techniques where a voltage causes the refractive index of the coupling film to increase thus reducing the critical angle for TIR. In this case, there is no movement of the coupling film, only a change in the refractive index.
4. Mechanical motor that rotates around that causes the coupling film to touch the optical waveguide once per revolution.

Figure 11:
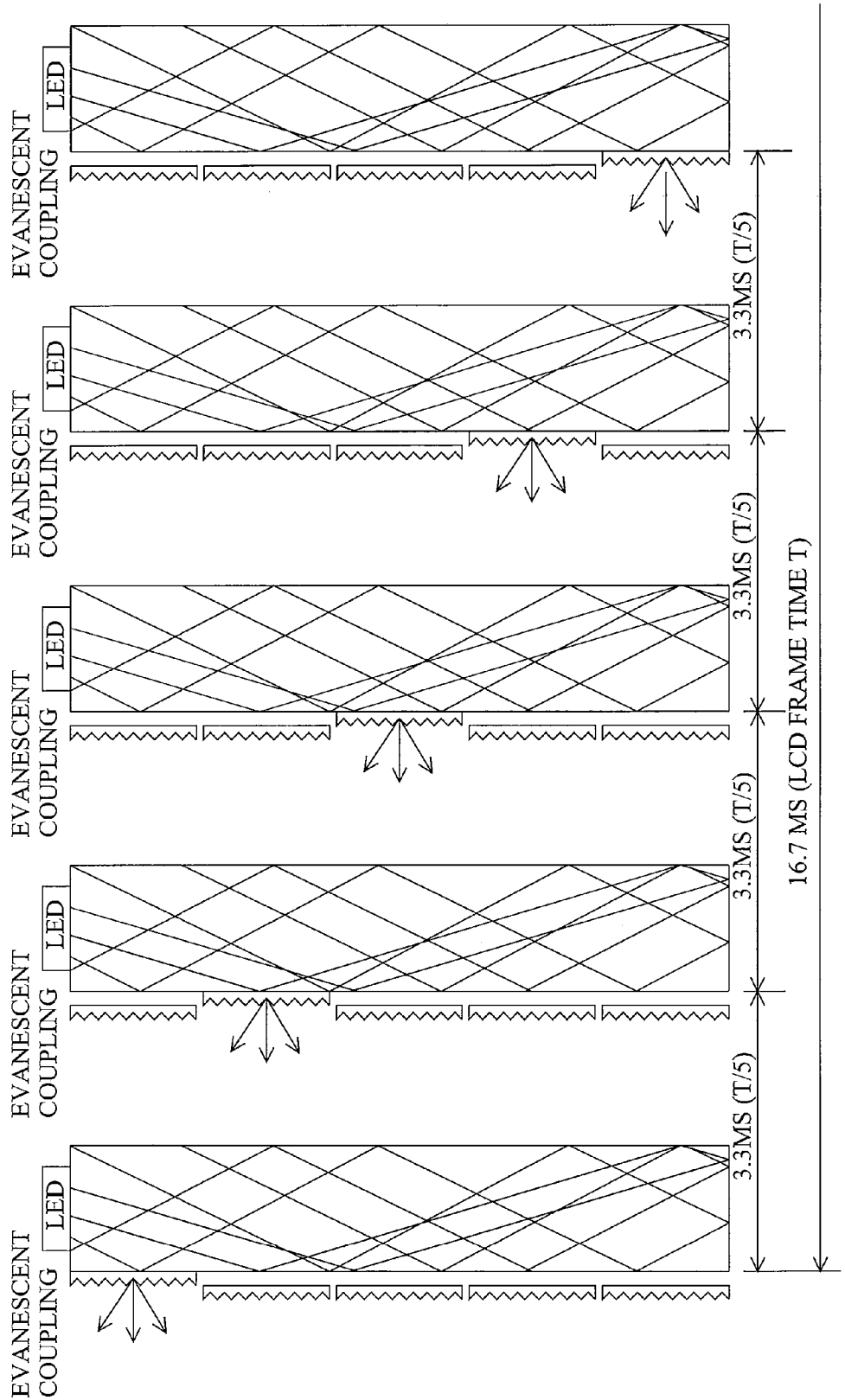
FIG. 11 illustrates light steering using electrostatic FTIR.

As shown in FIG. 9, the optical waveguide may be arranged vertically across the display. The coupling light output from the waveguide may be synchronized with LCD driving, which is normally done from top to bottom, one line at a time. The light is steered out at the top, then next row, until it reaches the bottom, and then repeats the process. FIG. 11 illustrates the light steering sequence for a backlight with 5 steerable segments. At frame start, the first (top in the figure) row is selected for light output. The LED output intensity, or the pulse width modulation (PWM) width, or both the intensity and the PWM width are modulated based on the desired backlight for that position. All the other areas are black. At $1/5^{th}$ the frame period (3.3 ms), the first row is de-selected which causes the coupling film to move away from the waveguide, and the $2^{nd}$ row is selected which causes the coupling film to move close to the waveguide so that FTIR occurs for the second row. The LED driving values that corresponds to the second row is loaded into the LED drivers and all the LED light illuminates the area corresponding the $2^{nd}$ row. The process is repeated for the $3^{rd}$, $4^{th}$ and $5^{th}$ rows to complete one LCD frame. Alternatively, it is possible that the functions of the LEDs and the light steering may be reversed, if desired.

One advantage of this temporal multiplexed driving is the reduced temporal aperture which reduces the motion blur. Each steerable row is "on" for only a fraction of the temporal period makes it an impulsive display that can achieve blur reduced rendering of a motion sequence.

The above light steering can be applied for a point light source such as a laser with two dimensional steering. The light is first coupled to a two dimensional waveguide with M (horizontal)×N (vertical) steerable backlight elements. The light output is scanned from top to bottom and left to right as it is done in a CRT display.

Figure 12:
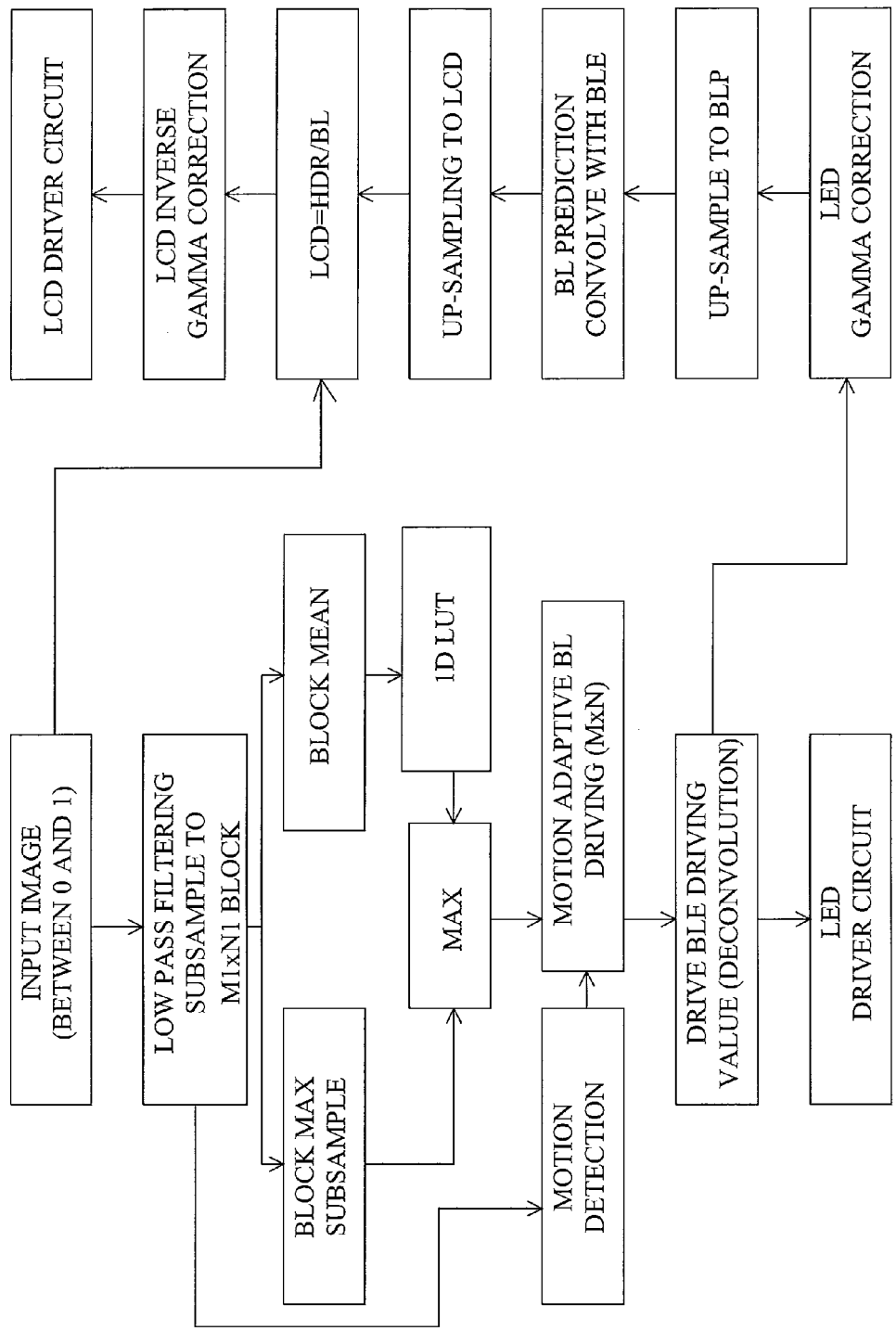
FIG. 12 illustrates a flow chart for deriving LED and LCD driving values for input to a display.

The steerable backlight is equivalent to an area active backlight with M (number of column drivers)×N (number of steerable units)×C (number of color channels) backlight elements. FIG. 12 shows the flowchart of a technique to convert an input image into a low resolution two dimensional backlight (steerable one dimensional backlight) and a high resolution LCD image. The LCD resolution is m×n pixels with its range from 0 to 1, with 0 to be black and 1 to be the maximum transmittance. The backlight resolution is M×N with M<m and N<n. One may assume that the input image has the same resolution as LCD. If input image is of different resolution, a scaling or cropping step may be used to convert the input image to LCD image resolution. The first step is to derive the desired backlight from the input image.

Figure 13:
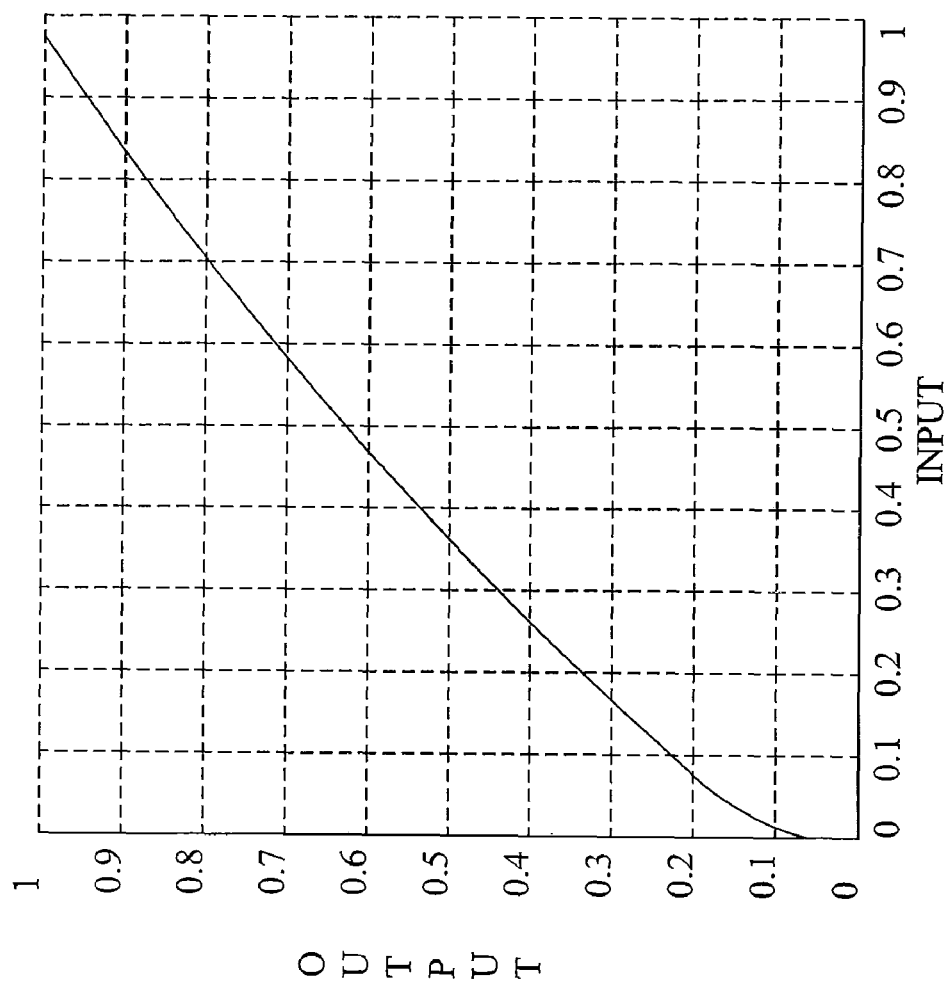
FIG. 13 illustrates tone mapping.

The input image is low pass and sub-sampled (down sample) to an intermediate resolution of (M1×N1), one example is 8 times the BLE resolution (8M×8N). Extra resolution is useful to detect motion and to preserve the specular highlight. The maximum of the 8×8 sub-sampled image forms the LEDmax Image (M×N). The block mean image is then tone mapped via an 1D LUT as shown in FIG. 13. The curve contains a dark offset and expansion nonlinearity to make the backlight at dark region slightly higher. This will reduced the visibility of dark noise and compression artifacts. The maximum of the two is used as the target backlight value.

The target backlight has the same size as the number of active backlight elements (M×N). Flickering (i.e. intensity fluctuation) can be observed when an object moves across BLE boundaries. This boundary object movement causes an abrupt change in BLE driving value. Theoretically, the change in backlight can be compensated by the LCD. But due to timing difference between the LED and LCD, and mismatch in the PSF used in the calculation of the compensation and the actual PSF of that BLE, there is some small intensity variation. This intensity variation might not be noticeable when the eye is not tracking the object motion. But when eye is tracking the object motion; this small backlight change becomes periodic fluctuation. The frequency of the fluctuation is the product of video frame rate and object motion speed in terms of BLE blocks per frame. If an object moves across a BLE block in 8 video frames and the video frame rate is 60 Hz, the flickering frequency is 60 hz*0.125=7.5 Hz. This is about at the peak of human visual sensitivity to flickering and it makes a very annoying artifact. To reduce this motion flickering, a motion adaptive algorithm may be used to reduce the sudden BLE output change when an object moves across the BLE grids. Motion detection is used to divide video image into two classes: motion region and still region. In the motion region, the backlight contrast is reduced so that there is no sudden change in BLE driving value. In the still region, the backlight contrast is preserved to improve the contrast ratio and reduce power consumption.

Motion detection may be done at the subsampled image at M1×N1 resolution. The value at current frame was compared to the corresponding block in the previous frame. If the difference is greater than a threshold, then the backlight block that contains this block is classified as motion block. In the preferred embodiment, each backlight block contains 8×8 sub-blocks. The process of motion detection may be as follows:

For each frame;
1. Calculate the average of each sub-block in the input image for the current frame;
2. If the difference between the average in this frame and the sub-block average of the previous frame is greater than a threshold (for an example, 5% of total range), then backlight block that contains the sub-block is a motion block. Thus a first motion map is formed;
3. Perform a morphological dilation operation on the motion map (change the still blocks neighboring to a motion block) to form an enlarged motion map.
4. For each backlight block, the motion status map is updated based on the motion detection results:
   if it is motion block,
   mMap(i,j)=min(4, mMap(i,j)+1);
   else (still block)
   mMap(i,j)=max(0, mMap(i,j)-1).

The LED driving value is given by $$LED_2(i,j) = \left(1 - \frac{mMap}{4}\right) LED_1(i,j) + \frac{mMap}{4} LED_{max}(i,j)$$

$LED_{max}$ is the local max of LEDs in a window that centers on the current LED. One example is a 3×3 window. Another example is a 5×5 window.

Thus, it may be observed that in those regions that include non-motion the energy is spit over two (or more) frames which reduces flickering but increases blur. However, without any significant motion there should be no significant blur. Accordingly, it may be observed that in those regions that include motion the energy is moved to a single frame which increases the flickering but reduces the blur. The relative distribution of energy based upon motion improves image quality.

An alternative embodiment is using motion estimation. The window is aligned with the motion vector. This approach reduces the window size and preserves the contrast in the non motion direction, but the computation of motion vector may be more complex than merely motion detection.

Since the PSF spread of BLE is larger than the BLE spacing to provide a more uniform backlight image, there is considerable crosstalk between the BLE elements that are located close together. An iterative de-convolution algorithm may be used to derive the BLE driving value. Once the BLE driving value is determined, it is stored in a frame memory send to the BLE (e.g. LED) driver one row at a time. The backlight distribution may be predicted by the convolution of the BLE driving value and the point spread function of the BLE. Once the backlight distribution is calculated, the LCD value is derived by dividing the input image by the backlight.

Figure 14:
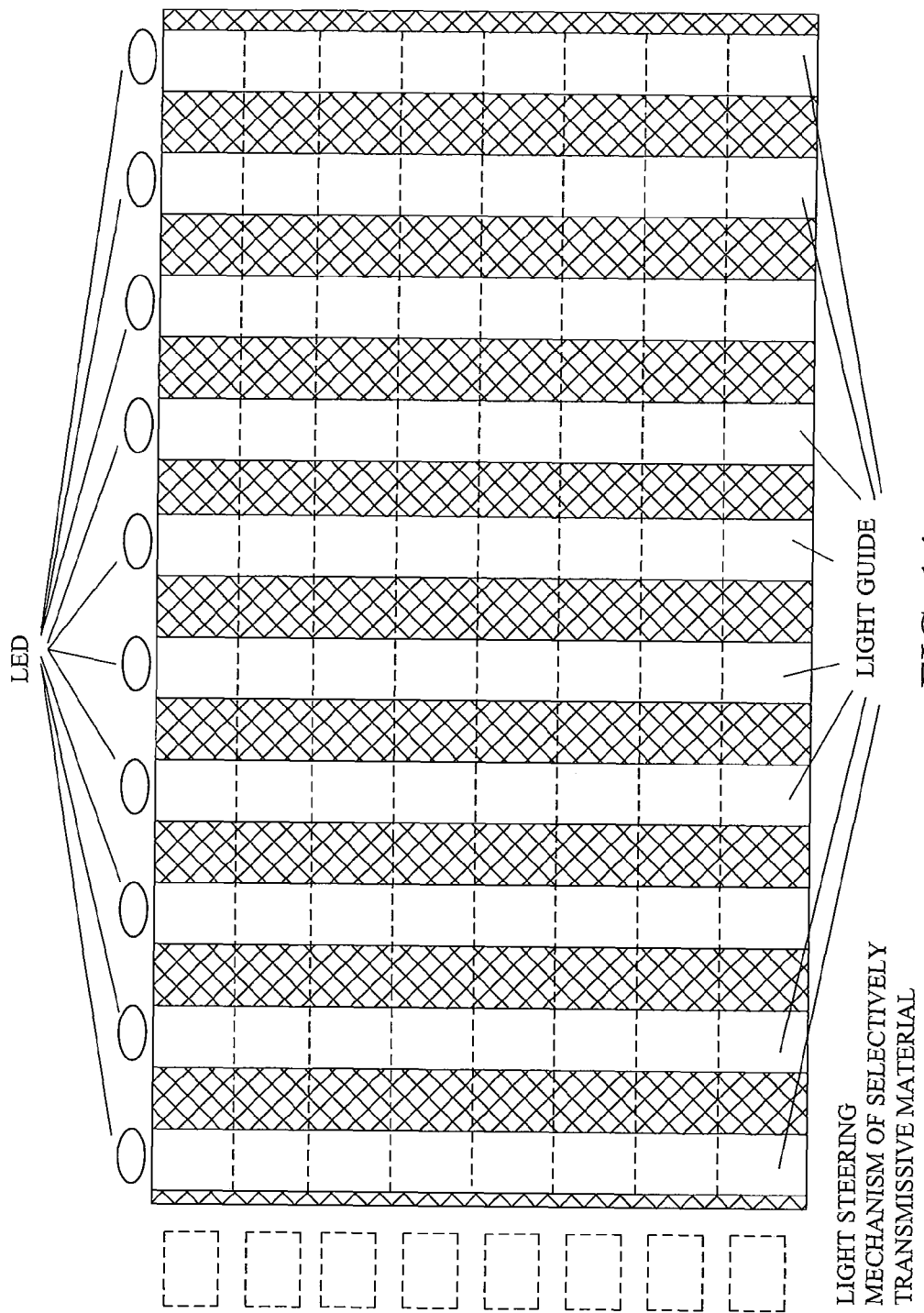
FIG. 14 illustrates a LCD backlight consisting of 1D backlight elements and a transparent material based steering mechanism.
Figure 15:
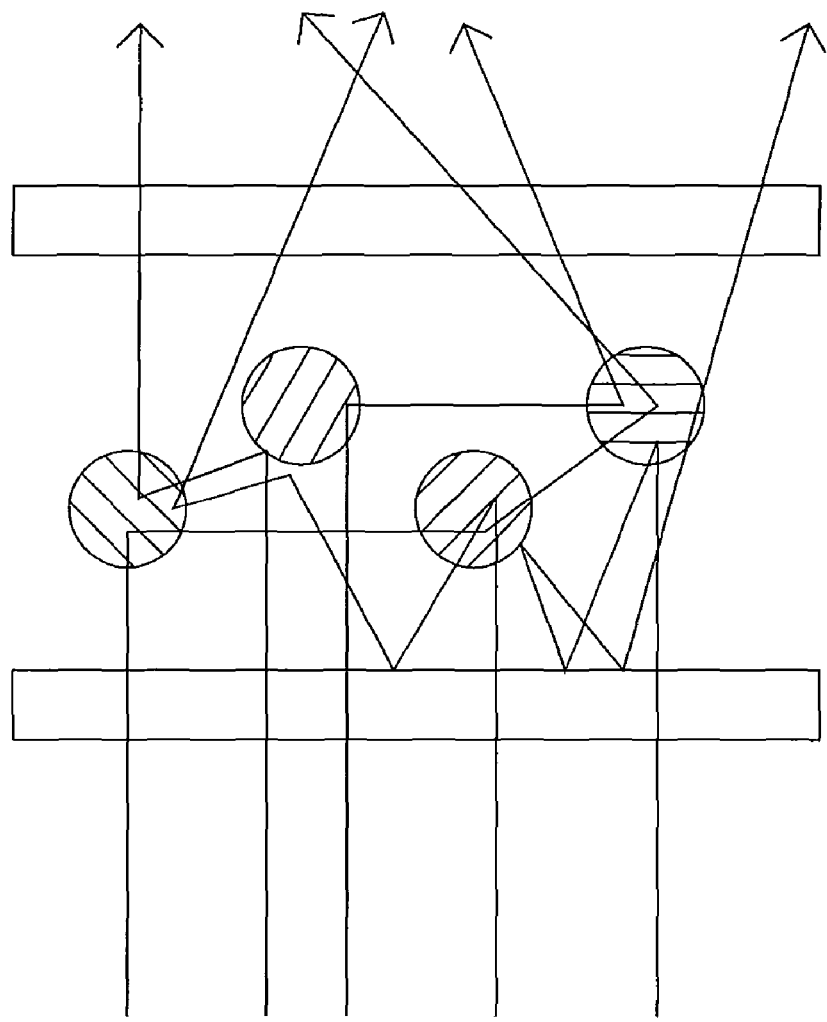
FIG. 15 illustrates the transparent material of FIG. 14 in an off state.
Figure 16:
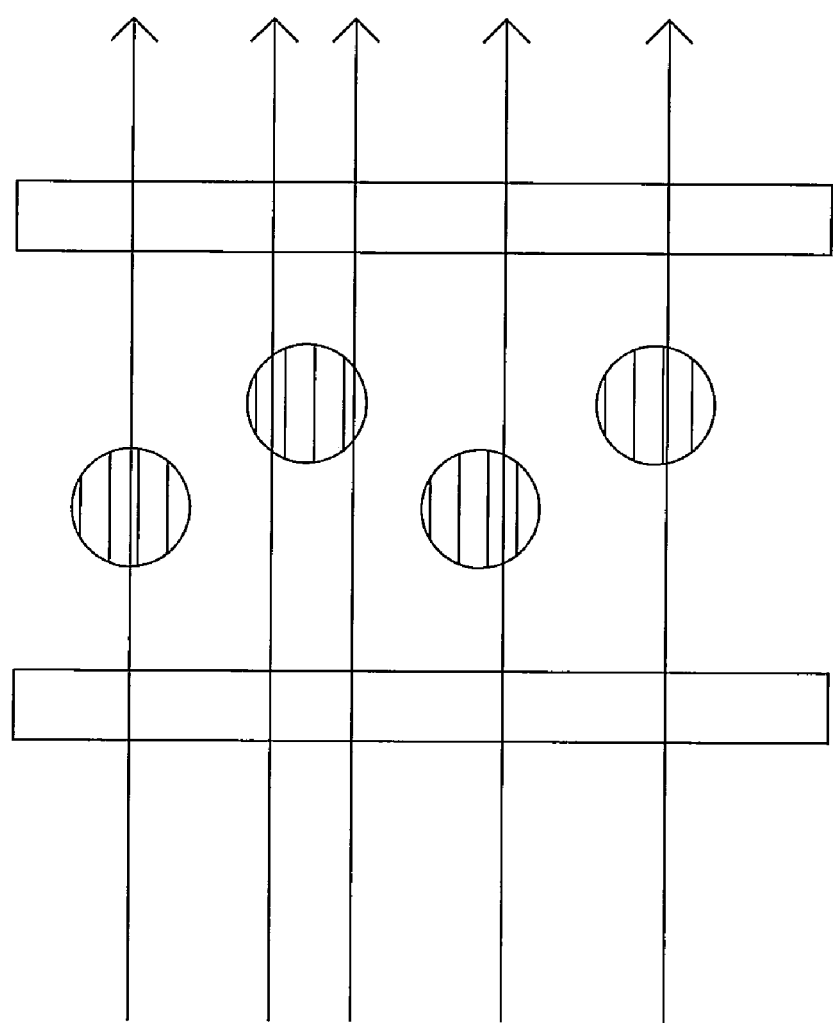
FIG. 16 illustrates the transparent material of FIG. 14 in an on state.

Referring to FIG. 14, another technique for controlling the light output of the display is to include a layer of selectively generally transparent material, which is preferably separated into a plurality of rows, that selectively modifies the transmission of light through it based upon the application of an electrical signal. Referring to FIG. 15, in a first "off" state, without the application of an electrical voltage to the transparent material, the refractive index of the transparent material, such as liquid crystal balls is different from the surrounding media which causes scattering or changing direction of impeding light. This scattering produces FTIR and light is extracted from the waveguide. Thus, all the regions of the display associated with the transparent material being in an on-state (e.g., no applied electrical voltage) will tend to be brightened due to light extraction in that region. Referring to FIG. 15 in a second "on" state, with the application of an electrical voltage to the transparent material, the refractive index in the LC ball matches the surrounding media, thus the transparent material tends to pass the light incident thereon through without scattering or otherwise impeding the transmission of light through it. Thus, all the regions of the display associated with the transparent material being in an off-state (e.g., applied electrical voltage) will tend to be otherwise darkened due TIR.

Figure 17:
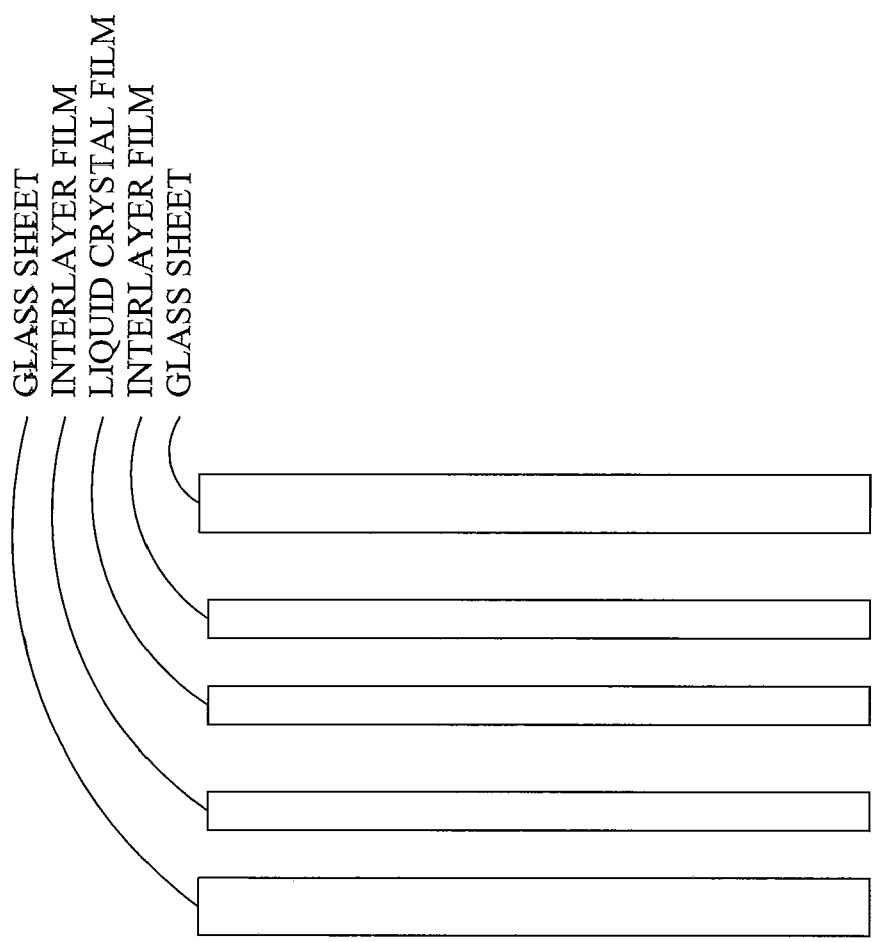
FIG. 17 illustrates the layers of the transparent material of FIG. 14.
Figure 18:
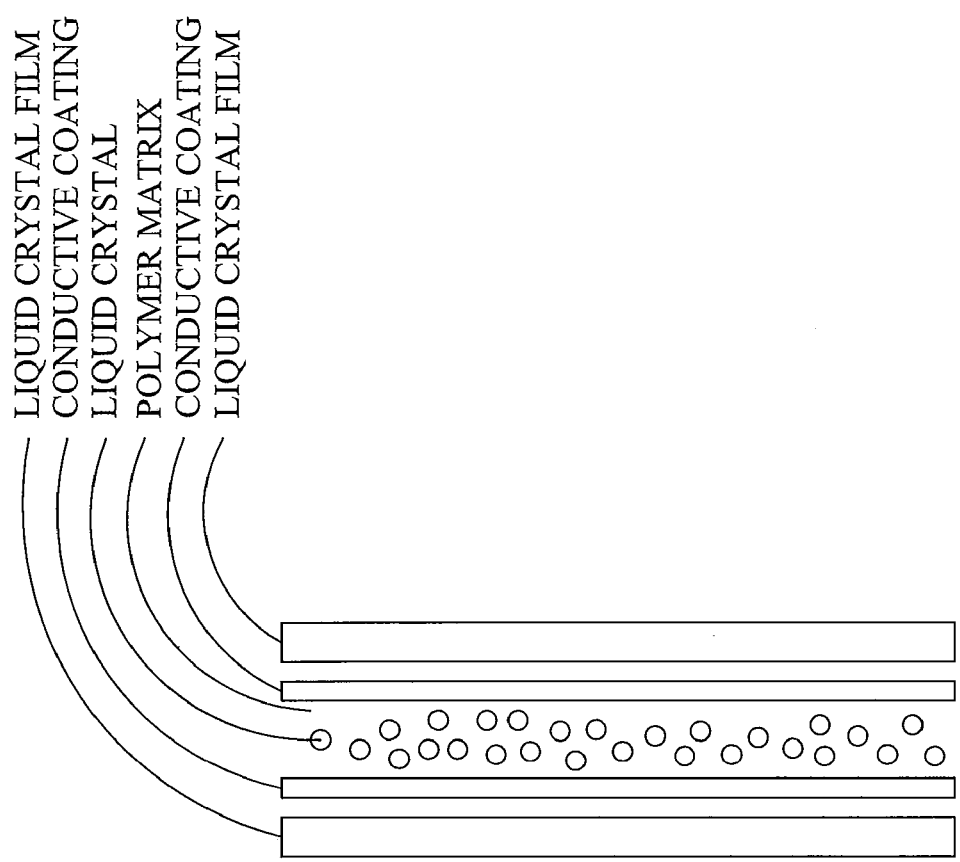
FIG. 18 illustrates a polymer matrix with liquid crystals therein of the transparent material of FIG. 14.

Referring to FIG. 17, the transparent material may be made from a liquid crystal based film 400 that is sandwiched between two layers of transparent conductive film 402 and 404. The transparent conductive films 402 and 404 are typically sandwiched between been a pair of glass sheets 406 and 408. Referring to FIG. 18, the liquid crystal based film includes a polymer matrix with liquid crystals therein. With the application of an electrical signal to one or more of the conductive films 402 and 404, the transparent material is in the "off" state. Without the application of an electrical signal to the conductive films 402 and 404, the transparent material is in the "on" state. It is possible to change the "on" and "off" state by changing the relative refractive index of the LC and its surrounding media.

The preferred configuration of the transparent material operates based upon a 100 volt 50/60 hertz signal. In the off state the parallel light transmission may be 75% light transmittance, with 7.5% haze, while in the on state the parallel light transmission may be 74% light transmittance with 94% haze.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:
1. A display comprising:
   (a) a liquid crystal layer;
   (b) a backlight that provides light to said liquid crystal layer;
   (c) said liquid crystal layer selectively modifying the transmission of light from said backlight to the front of said display;
   (d) said backlight includes a plurality of spaced apart light waveguides;
   (e) said display includes a plurality of selection elements associated with said light waveguides that selectively inhibit the transmission of light toward said liquid crystal layer, wherein said selection elements includes liquid crystal material in a polymer matrix and that alternates between an on and an off state, respectively, upon selective application of a voltage;
   (f) wherein the combination of said waveguides and said selection elements provide light to regions of said liquid crystal layer in a temporally sequential manner during a frame.

2. The display of claim 1 wherein said plurality of said waveguides are arranged in a parallel arrangement with respect to one another.

3. The display of claim 2 further including a light steering mechanism that selectively directs light to at least one, and less than all, of said light waveguides at any particular time.

4. The display of claim 3 wherein at least one of said selection elements is associated with a respective one of said plurality of waveguides.

5. The display of claim 4 wherein for a respective one of said plurality of waveguides that light is only substantially emitted from said respective guide at a position associated with a selected respective one of said selection elements.

6. The display of claim 5 wherein said combination results in a temporal multiplexed illumination of said display.

7. The display of claim 1 wherein said liquid crystal material in said polymer matrix is sandwiched between conductive layers.

8. The display of claim 7 wherein said transmission is based upon the application of a voltage to at least one of said conductive layers.

9. The display of claim 1 wherein said backlight includes a plurality of light emitting diodes that provides light to respective said waveguides.

10. The display of claim 1 wherein said backlight includes a plurality of one-dimensional said waveguides.

11. The display of claim 1 wherein said selection elements are light extractors.

12. The display of claim 1 wherein said selection elements use frustrated total internal reflection.

13. The display of claim 1 wherein said selection elements include micro optical structures.

14. The display of claim 6 wherein said micro optic structures include a thin film layer forming a lens and shutter.

15. The display of claim 1 wherein said temporal aspect of said combination results in a decrease in motion blur.

16. The display of claim 1 wherein a plurality of said waveguides extend across the entire said display.

17. The display of claim 10 wherein said light steering mechanism is scanned from top to bottom of said display.

18. The display of claim 10 wherein said light steering mechanism includes a mechanical shutter.

19. The display of claim 1 wherein regions of an image to be displayed that is determined not to have motion have a slower rate of providing light to said waveguides than regions of said image to be display that is determined to have motion.

20. A display comprising:
(a) a liquid crystal layer;
(b) a backlight that provides light to said liquid crystal layer;
(c) said liquid crystal layer selectively modifying the transmission of light from said backlight to the front of said display;
(d) said backlight includes a plurality of spaced apart light waveguides arranged in a one-dimensional parallel array extending from one side to the other side of said display;
(e) said backlight includes at least one light source associated with each of said waveguides;
(f) said display includes a plurality of selection elements associated with each of said waveguides such that selective activation of one of said selection elements results in light not being substantially inhibited that is directed light toward said liquid crystal layer while light is substantially inhibited that is directed toward said liquid crystal layer where one of said selection element is not selected;
(g) said selection elements include liquid crystal material in a polymer matrix sandwiched between conductive layers;
(h) each of said waveguides are provided with light in a sequential manner while a plurality of associated selection elements for each of said waveguides are selected so that light is selectively emitted from each of said respective waveguide.

21. The display of claim 20 wherein regions of an image to be displayed that is determined not to have motion have a slower rate of providing light to said waveguides than regions of said image to be display that is determined to have motion.

* * * * *